(12) United States Patent
Nakayama et al.

(10) Patent No.: US 8,305,634 B2
(45) Date of Patent: Nov. 6, 2012

(54) IMAGE PROCESSING DEVICE, IMAGE RECORDING SYSTEM, IMAGE PROCESSING METHOD AND COMPUTER-READABLE MEDIUM

(75) Inventors: Kota Nakayama, Kanagawa (JP); Akira Mihara, Kanagawa (JP); Kenichi Kawauchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 983 days.

(21) Appl. No.: 12/325,485

(22) Filed: Dec. 1, 2008

(65) Prior Publication Data
US 2009/0290183 A1 Nov. 26, 2009

(30) Foreign Application Priority Data
May 23, 2008 (JP) ................................. 2008-135418

(51) Int. Cl.
G06F 3/12 (2006.01)
H04N 1/405 (2006.01)
B41J 2/015 (2006.01)
B41J 23/00 (2006.01)

(52) U.S. Cl. ......... 358/1.8; 358/3.03; 358/3.06; 347/20; 347/37

(58) Field of Classification Search .............. 358/1.8, 358/3.03, 1.9, 3.06, 461, 502; 347/8, 9, 20, 347/37, 47
See application file for complete search history.

(56) References Cited

U.S. PATENT DOCUMENTS

| | | | |
|---|---|---|---|
| 6,930,800 B1 | 8/2005 | Adachi et al. | |
| 7,907,306 B2 * | 3/2011 | Yamazaki | 358/3.03 |
| 2003/0137698 A1 | 7/2003 | Pritchard | |
| 2006/0284916 A1 | 12/2006 | Heiles et al. | |

FOREIGN PATENT DOCUMENTS

| | | |
|---|---|---|
| JP | 2000-141768 | 5/2000 |
| JP | 2000-165672 | 6/2000 |
| JP | 2003-264697 | 9/2003 |
| JP | 2007-001306 | 1/2007 |

* cited by examiner

Primary Examiner — Charlotte M Baker
(74) Attorney, Agent, or Firm — Fildes & Outland, P.C.

(57) ABSTRACT

In an image processing device, the memory stores conversion characteristic information corresponding to respective recording portions of an image recording device that records an image at a recording medium while moving a recording unit, which is provided with a plurality of the recording portions arrayed in a first direction, relative to the recording medium in a second direction that is perpendicular to the first direction, the conversion characteristic information expressing conversion characteristics for converting image data in units of one pixel. The first processing unit performs conversion processing along the first direction, continuously converting respective sets of pixel data aligned in the second direction, using conversion characteristic information that corresponds to the recording portions. The second processing unit performs image processing in the order of processing by the first processing unit. The output unit outputs the image data to the image recording device as aligned in the first direction.

16 Claims, 14 Drawing Sheets

IMAGE PROCESSING DEVICE, IMAGE RECORDING SYSTEM, IMAGE PROCESSING METHOD AND COMPUTER-READABLE MEDIUM

CROSS-REFERENCE TO RELATED APPLICATIONS

This application is based on and claims priority under 35 USC 119 from Japanese Patent Application No. 2008-135418 filed May 23, 2008.

BACKGROUND

1. Technical Field

The present invention relates to an image processing device, an image recording system, an image processing method and a computer-readable medium.

2. Related Art

In recent years, commercial printers utilizing an ink-jet system and devised with a view to low running costs have received particular attention. Commercial printers tend to be higher-speed, yield higher image quality and use larger paper than ordinary printers. One-pass printing using a recording head that is lengthened to a size corresponding to the width of the paper has been proposed as a technique for increasing speed. This technique utilizes a recording head that has plural ink-ejecting nozzles arrayed along a span extended to approximately an equal length with the recording paper and involves printing by ejecting ink droplets with the head fixed in one position while feeding the recording paper. In order to print with high image quality, the number of recording heads is generally increased, thereby increasing the resolution.

SUMMARY

In consideration of the above circumstances, the present invention provides an image processing device, an image recording system, an image processing method and a computer-readable medium.

According to an aspect of the invention, an image processing device is provided with: a memory that stores conversion characteristic information corresponding to respective recording portions of an image recording device that records an image at a recording medium while moving a recording unit, which is provided with plural of the recording portions arrayed in a first direction, relative to the recording medium in a second direction that is perpendicular to the first direction, the conversion characteristic information expressing conversion characteristics for converting image data in units of one pixel; a first processing unit that performs a conversion processing procedure along the first direction, continuously converting respective sets of pixel data, each of the sets of pixel data being for recording plural pixels aligned in the second direction and to be recorded by a different one of the recording portions, using conversion characteristic information stored in the memory corresponding to the respective recording portions; a second processing unit that performs an image processing procedure in units of plural pixels of the image data that has been processed at the first processing unit, the image data being aligned in the order of processing at the first processing unit; and an output unit that outputs the image data that has been processed at the second processing unit to the image recording device as aligned in the first direction.

BRIEF DESCRIPTION OF THE DRAWINGS

Exemplary embodiments of the present invention will be described in detail based on the following figures, wherein.

DETAILED DESCRIPTION

In the following, exemplary embodiments of the present invention are explained in detail with reference to the drawings.

Figure 1:
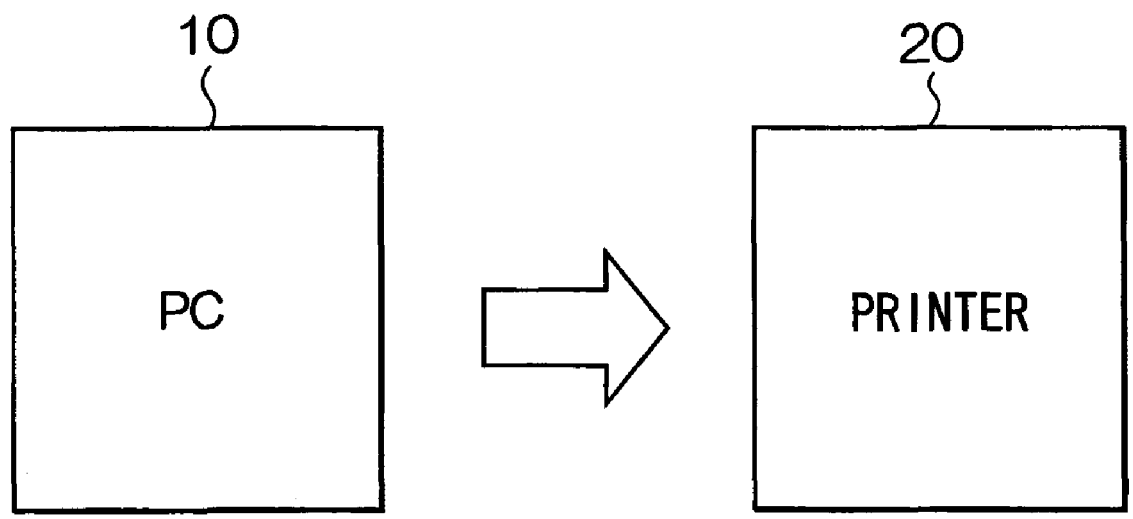
FIG. 1 is a block diagram showing a schematic configuration of one exemplary embodiment of the image recording system of the present invention.

FIG. 1 is a block diagram showing a schematic configuration of one exemplary embodiment of the image recording system of the present invention. The image recording system is provided with personal computer (PC) 10 and printer 20.

Figure 2:
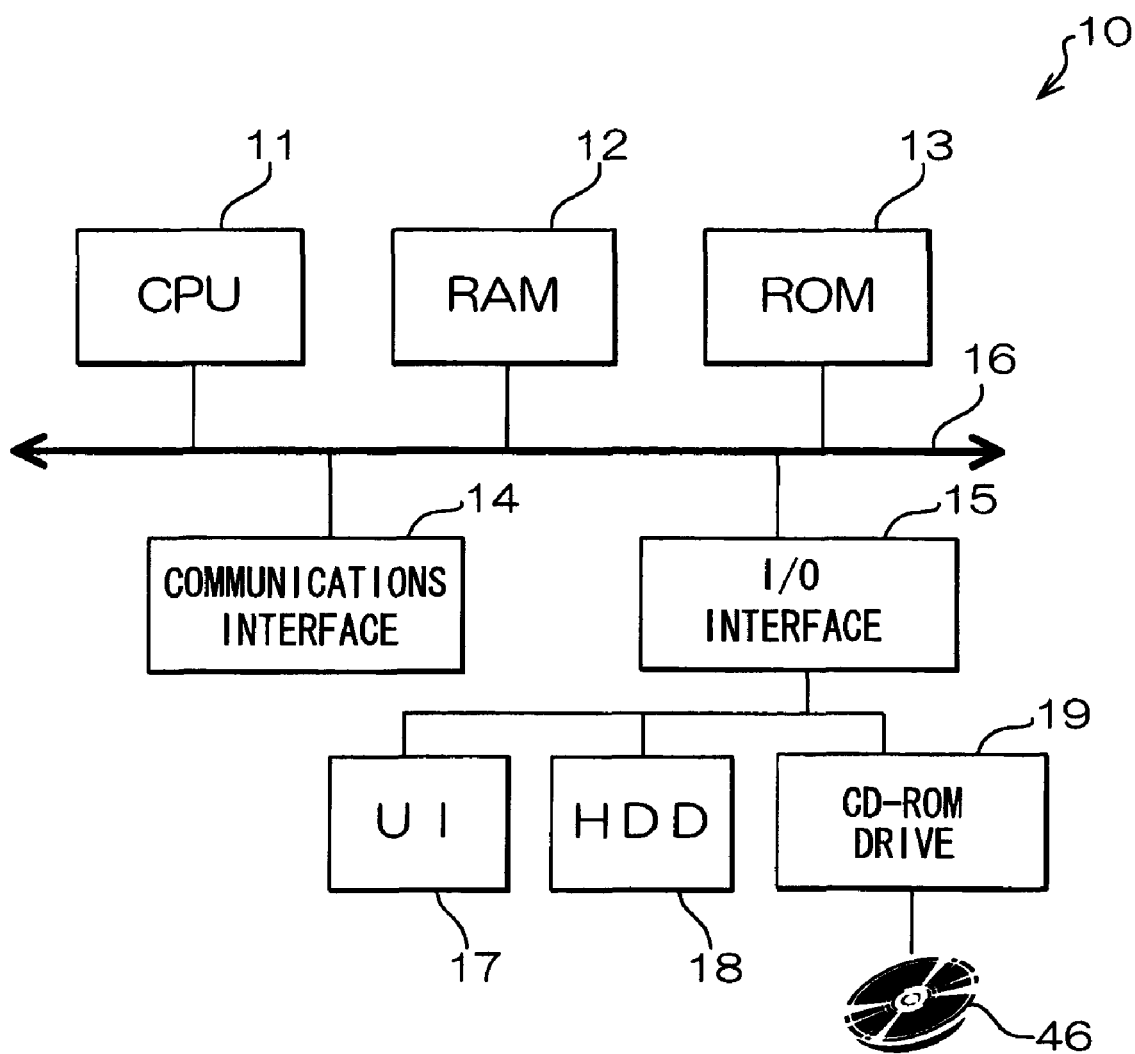
FIG. 2 is a block diagram showing a schematic configuration of a PC.

FIG. 2 is a block diagram showing a schematic configuration of PC 10.

As shown in FIG. 2, PC 10 is configured to include CPU (Central Processing Unit) 11, RAM (Random Access Memory) 12 and ROM (Read Only Memory) 13.

CPU 11 controls all the operations of PC 10 and executes image data transfer processing (described below) in accordance with the appropriate program. The image data to be transferred is two-dimensional image data composed of pixel rows of plural pixels arrayed in a given direction (the X direction) further arrayed in plural lines in a direction (the Y direction) perpendicular to the given direction, and is formed from plural pixel data corresponding to respective pixels (refer to FIG. 5).

RAM 12 is a volatile storage device that stores, for example, programs to be executed by CPU 11 and parameters that are varied as appropriate when the programs are executed, and is used as a work memory. A region of one part of RAM 12 is used as a region that temporarily stores image data.

ROM 13 is a non-volatile storage device at which boot programs are stored that operate when PC 10 is started up.

PC 10 is provided with communications interface 14 and I/O interface 15. CPU 11, RAM 12, ROM 13, communications interface 14 and I/O interface 15 are respectively connected via bus 16.

Communications interface 14 is an interface for transmission and reception of data to and from an external device (such as printer 20) that is connected to PC 10 either directly or via a network. PC 10 transmits print commands and image data to be printed to printer 20 via communications interface 14.

UI (user interface) 17, HDD (hard disk drive) 18 and CD-ROM drive 19 are connected to I/O interface 15. UI 17 is a device for inputting and displaying respective kinds of data. HDD 18 is a non-volatile storage device at which, for example, an OS (operating system) and programs for sending image data to printer 20 and the like are stored. CD-ROM drive 19 is a device for reading data stored at CD-ROM 46.

In PC 10, CPU 11 reads out and executes programs stored at HDD 18. In the present exemplary embodiment, execution of programs by CPU 11 results in execution of respective kinds of processing such as image transfer processing.

The recording medium that stores programs to be executed by CPU 11 is not limited to ROM 13 and HDD 18, and may be any kind of detachable storage medium (such as CD-ROM 46) or a transmission medium such as a carrier wave for electric telecommunications lines.

Figure 3:
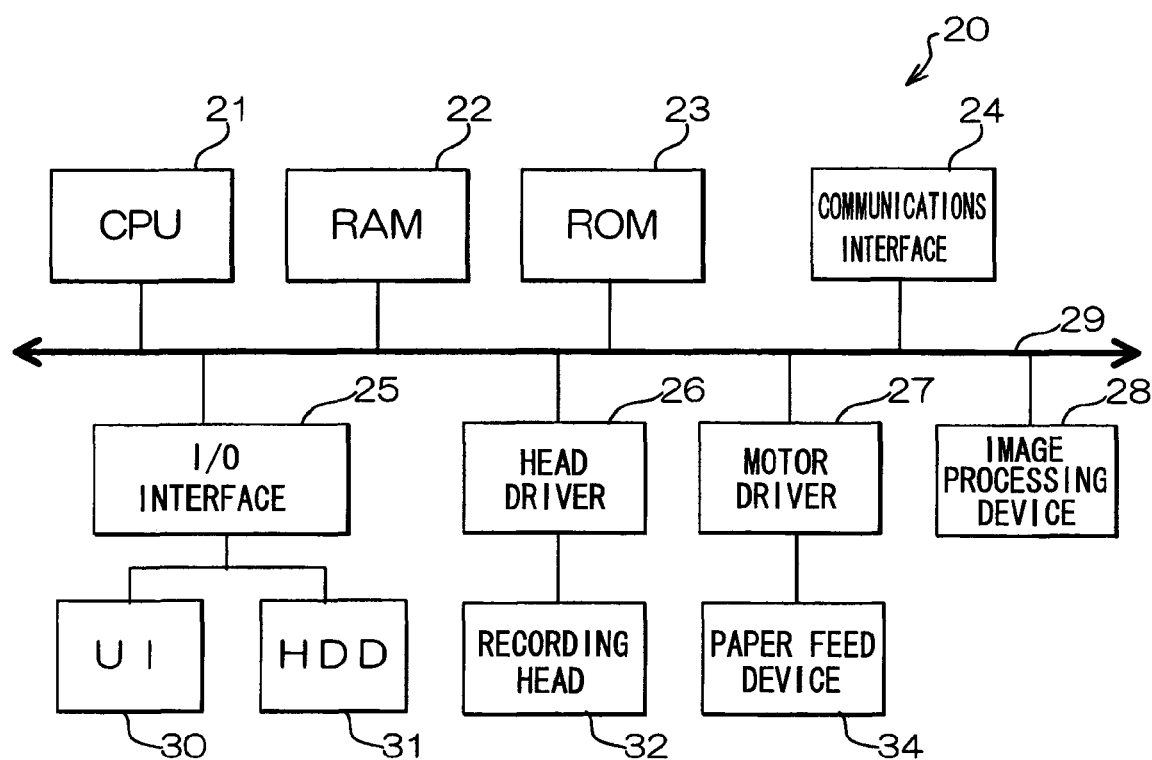
FIG. 3 is a block diagram showing a schematic configuration of a printer.

FIG. 3 is a block diagram showing a schematic configuration of printer 20.

As shown in FIG. 3, printer 20 is provided with CPU 21, RAM 22, ROM 23, communications interface 24, I/O interface 25, head driver 26, motor driver 27 and image processing device 28, which are respectively connected by bus 29.

CPU 21 controls all the operations of printer 20 and executes respective functions in accordance with the appropriate programs.

RAM 22 is a volatile storage device that stores, for example, programs to be executed by CPU 21 and parameters that are varied as appropriate when the programs are executed, and is used as a work memory. A region of one part of RAM 22 is used as a region that temporarily stores image data.

ROM 23 is a non-volatile storage device at which boot programs that operate when printer 20 is started up, and respective kinds of LUT data and respective kinds of parameter as described below, are stored.

Communications interface 24 is an interface for transmission and reception of data to and from an external device (here, PC 10) that is connected to printer 20 either directly or via a network. Printer 20 receives print commands and image data to be printed from PC 10 via communications interface 24.

UI 30 and HDD 31 are connected to I/O interface 25. UI 30 is a device for inputting and displaying respective kinds of data. HDD 31 is a non-volatile storage device at which, for example, an OS (operating system) and programs for performing respective kinds of control operations for printing image data received from PC 10, and the like, are stored. The recording medium that stores programs to be executed by CPU 21 is not limited to ROM 23 and HDD 31, and may be any kind of detachable storage medium or a transmission medium such as a carrier wave for electric telecommunications lines.

Recording head 32 is connected to head driver 26. Recording head 32 in the present exemplary embodiment has 34016 nozzles 33, which eject ink droplets, arrayed at a pitch of 1200 dpi in order to enable printing in one pass of the length of the long side (720 mm) of a half Kikuban-sized recording medium (refer to FIG. 5). Half Kikuban size is 636 mm×470 mm. The nozzle pitch and number of nozzles 33 in recording head 32 in the present exemplary embodiment represent one example and are not limited thereto.

Head driver 26 drives recording head 32. Specifically, head driver 26 applies a drive voltage of a given waveform corresponding to input image data, with respect to piezoelectric elements provided so as to correspond to each of nozzles 33 of recording head 32, as a result of which ink droplets are ejected from each of nozzles 33. Here, whether or not to eject an ink droplet (presence or absence of dot) or the diameter (dot size) of an ink droplet to be ejected is controlled by altering the waveform of the drive voltage.

Paper feed device 34 is connected to motor driver 27. Motor driver 27 drives paper feed device 34 based on a control signal input from CPU 21 and feeds a paper as recording medium in a direction perpendicular to the direction in which nozzles 33 of recording head 32 are arrayed. Printer 20 of the present exemplary embodiment records a two-dimensional image by ejecting ink while moving recording head 32 relative to the paper at a constant speed (for example, 45 ppm (pages per minute)) in the direction (the direction of the arrow in FIG. 5) perpendicular to the direction in which nozzles 33 are arrayed.

Image processing device 28 applies respective kinds of image processing to image data input from PC 10 and generates, for example, 2-bit low-gradation image data per one pixel, which is sent to head driver 26 that drives recording head 32. As a result, ink droplets are ejected at recording head 32 in accordance with the image data.

Figure 4:
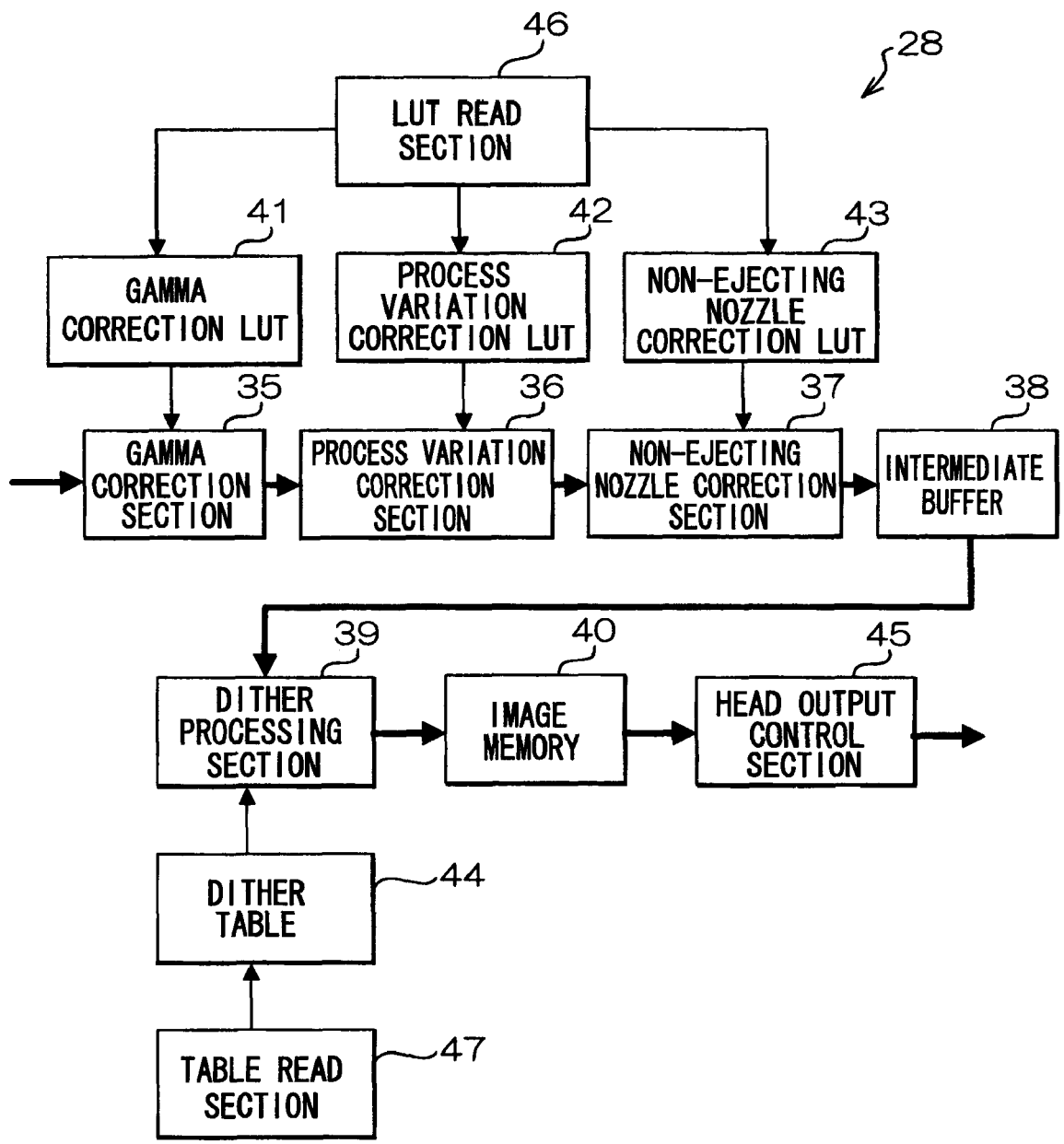
FIG. 4 is a block diagram showing a schematic configuration of an image processing device.

FIG. 4 is a block diagram showing a schematic configuration of image processing device 28. In FIG. 4, the flow of pixel data is indicated by the bold arrow.

Image processing device 28 is provided with gamma correction section 35, process variation correction section 36, non-ejecting nozzle correction section 37, intermediate buffer 38, dither processing section 39, image memory 40, head output control section 45, LUT (look-up table) read section 46 and dither table read section 47.

In addition, image processing device 28 is provided with a memory for storing gamma correction LUT 41 used at gamma correction section 35, process variation correction LUT 42 used at process variation correction section 36, non-ejecting nozzle correction LUT 43 used at non-ejecting nozzle correction section 37, and dither table 44 used at dither processing section 39. The memory is not shown in FIG. 4, but the respective tables are shown.

Here, gamma correction LUT 41, process variation correction LUT 42 and non-ejecting nozzle correction LUT 43 are tables that show conversion characteristics for converting input image data to image data corresponding to respective kinds of image processing, and the respective content thereof differs according to the kind of image processing. Dither table 44 is a table that stores a threshold value matrix used in dither processing.

Memory for expanding these tables is configured by memory allowing high-speed access such as SDRAM. In the present exemplary embodiment, information related to each of gamma correction LUT 41, process variation correction LUT 42, non-ejecting nozzle correction LUT 43 and dither table 44 is stored in advance at ROM 23 or the like. LUT read section 46 reads out required LUT information from among this LUT information from ROM 23 at a given timing and writes it into the LUT memory. Dither table read section 47 reads out dither table information from ROM 23 at a given timing and writes it into the memory for the table.

Gamma correction section 35 performs gamma correction processing, which is one kind of color correction, in units of one pixel based on gamma correction LUT 41. Gamma correction LUT 41 is an LUT for correcting the brightness of an image in accordance with the built-in gamma values of printer 20, and is an LUT having a correspondence relationship between input values and output values established in accordance with the gamma values. Further, gamma correction LUT 41 is shared by all of nozzles 33.

Process variation correction section 36 performs process variation correction processing in units of one pixel based on process variation correction LUT 42. There are cases when variations are generated in dot size, droplet speed or the like of ink droplets ejected from respective nozzles 33 due to variations that occur during the production of recording head 32 or the like. Corrections that adjust, for example, the amount of the ink droplet ejected are effective with regard to variations of this kind. These corrections are performed at process variation correction section 36.

Process variation correction LUT 42 used at process variation correction section 36 is an LUT having a correspondence relationship between input values and output values established in accordance with ejection characteristics of respective nozzles 33, and is a comparatively large LUT. For example, when recording head 32 incorporates a total of 34016 nozzles 33 and image data is 8-bit (256-gradation), and when the respective correction data are 16-bit, the size of the LUT required for the process variation correction processing is 16×256×34016 bits, which is a comparatively large size.

Non-ejecting nozzle correction section 37 performs non-ejecting nozzle correction processing in units of one pixel based on non-ejecting nozzle correction LUT 43. There are cases when recording head 32 includes nozzles 33 that are clogged by hardened ink or extraneous matter as a result of print processing and from which ink droplets are thus no longer ejected, and nozzles 33 from which ink droplets are not ejected at all due to an electrical fault. When nozzles 33 exist from which no ink droplets are to be ejected, it is necessary to convert the pixel data for pixels corresponding to any such nozzles to pixel data expressing that ink is not ejected (for example, to a white gradation value "0"). This conversion processing is performed at non-ejecting nozzle correction section 37.

Non-ejecting nozzle correction LUT 43 is an LUT for each of nozzles 33 consisting of 1-bit correction data expressed as "1" when the nozzle concerned is normal and "0" when the nozzle is non-ejecting. When the correction data is 1, non-ejecting nozzle correction section 37 outputs the input image data without modification, and when the correction data is 0, non-ejecting nozzle correction section 37 converts the input image data to 0 (white).

Further, information regarding ejection characteristics of nozzles 33 due to process variation and the positions of non-ejecting nozzles is determined in advance by experimentation or the like, and an LUT is created in advance based on this information and stored in ROM 23. Further, since non-ejecting nozzles may be created by the occurrence of clogging due to faults and extraneous matter during print processing in addition to at the manufacturing stage, an inspection of non-ejecting nozzles may be performed at a given printing interval (every given number of hours or printed sheets) and the LUT in ROM 23 overwritten. Since, as described above, non-ejecting nozzle correction LUT 43 consists of 1-bit data expressed as 0 or 1, the results of the inspection of non-ejecting nozzles may be immediately reflected in the LUT. Here, ROM 23 is a rewritable ROM.

In the present exemplary embodiment, gamma correction section 35, process variation correction section 36 and non-ejecting nozzle correction section 37 consist of hardware that may realize the respective functions thereof, such as multipliers and respective kinds of logical operation circuit, and are respectively connected in series in this order. That is, the output terminal of gamma correction section 35 is connected to the input terminal of process variation correction section 36 and the output terminal of process variation correction section 36 is connected to the input terminal of non-ejecting nozzle correction section 37. As a result, pipeline processing is performed. That is, pixel data input to the input terminal of gamma correction section 35 is first subjected to gamma correction processing at gamma correction section 35. The pixel data that has been subjected to gamma correction processing is then input to process variation correction section 36 and subjected to process variation correction processing. The pixel data that has been subjected to process variation correction processing is then input to non-ejecting nozzle correction section 37 and subjected to non-ejecting nozzle correction processing. Further, gamma correction section 35, process variation correction section 36 and non-ejecting nozzle correction section 37 are respectively configured so as to operate independently according to a given clock and the respective processing is performed in parallel.

Pixel data that has been subjected to non-ejecting nozzle correction processing at non-ejecting nozzle correction section 37 is sequentially input to and stored at intermediate buffer 38.

Dither processing section 39 performs dither processing, which is a kind of halftone processing (processing that converts multiple gradation data to low gradation data), with respect to the pixel data stored at intermediate buffer 38, based on the threshold value matrix shown by dither table 44. Dither processing is performed in units of blocks formed from plural contiguous pixels. The size of one such block is equal to the size of the threshold matrix. In the present exemplary embodiment, dither processing section 39 is also configured by hardware that realizes the functions of dither processing.

Pixel data that has been processed at dither processing section 39 is input sequentially in the order of processing to image memory 40 and stored thereat. The pixel data stored at image memory 40 is read out in synchronization with a given clock by head output control section 45 and output to head driver 26. As a result, ink is ejected from nozzles 33 of recording head 32 in accordance with the pixel data.

In the following, the operation of the image recording system according to the present exemplary embodiment is explained in detail using the example of printing an image of half Kikuban size.

At PC 10, when print data (for example, PDL (Page Description Language) format data) is input from an external computer or the like via communications interface 14, CPU 11 analyzes the print data and performs raster image conversion processing. As a result, the print data is converted to image data of a bitmap image. The respective pixel data constituting the image data are temporarily saved at RAM 12.

Figure 5:
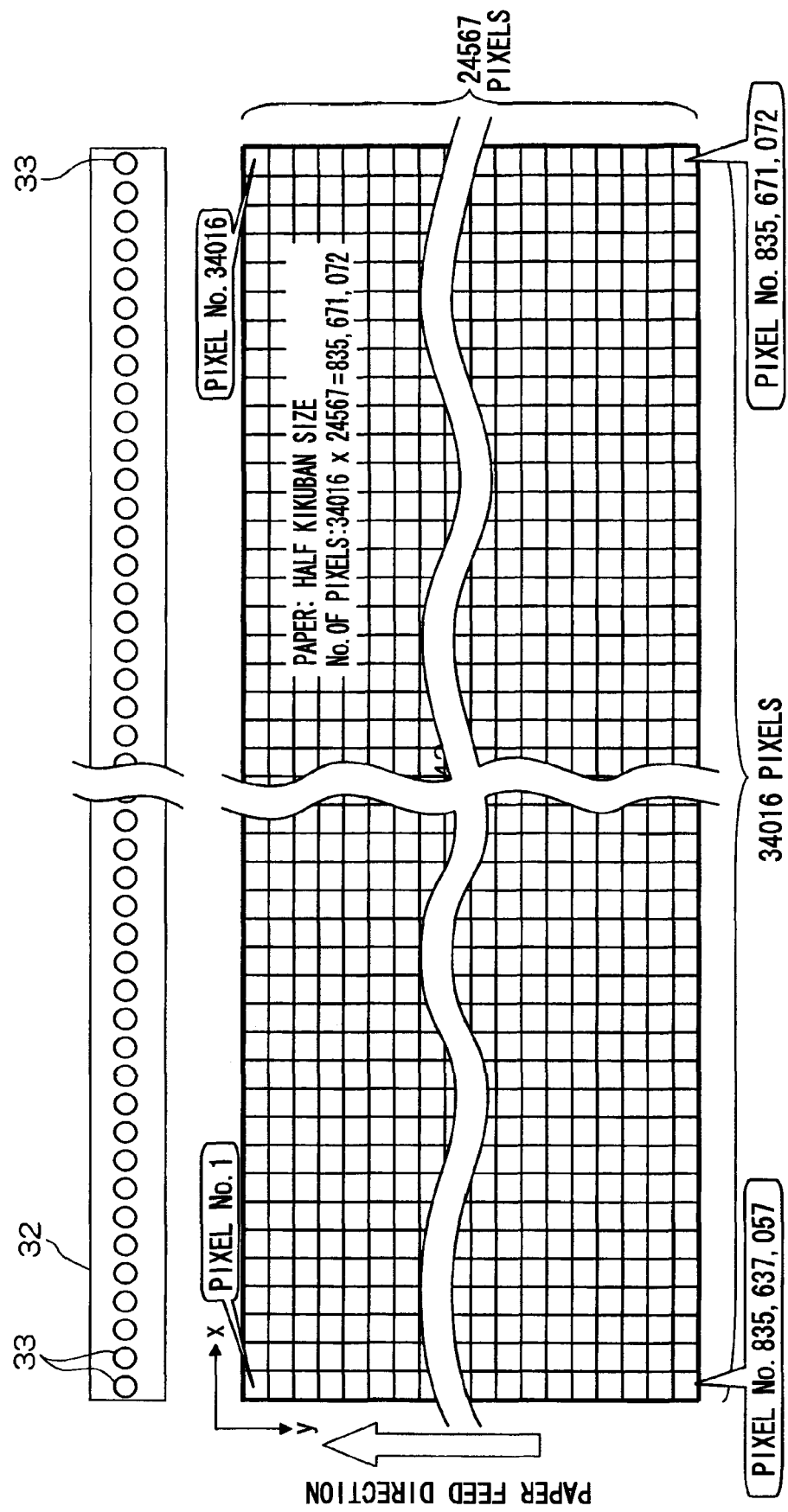
FIG. 5 is a diagram showing the correspondence between the alignment of pixels of a two-dimensional image of half Kikuban size and the nozzles of a recording head.

FIG. 5 shows the correspondence between the pixels of a two-dimensional image of half Kikuban size in an arrayed state and recording head 32. The two-dimensional image of half Kikuban size is an image formed from 34016 pixels aligned as one line in the X direction and 24567 such lines aligned in the Y direction, which is perpendicular to the X direction. That is, the number of pixels per one sheet of paper is 835,671,072.

As described above, 34016 nozzles 33 of recording head 32 are arrayed along the X direction. One line of pixels aligned in the X direction corresponds to nozzles 33 of recording head 32 and one line of pixels is printed by nozzles 33. By feeding a sheet of paper at a constant speed, respective pixel lines arranged adjacently in the Y direction are printed sequentially and, ultimately, a two-dimensional image is printed. Pixel data is arranged and saved at RAM 12 in the direction of nozzle array, that is, in the X direction.

When printing image data stored at RAM 12, CPU 11 sends a print command to printer 20 and also serially forwards image data by respective pixels. In conventional systems, pixel data is read out and forwarded in the order of alignment in the X direction, and image processing is performed based on X-direction alignment, followed by printing. However, in the present exemplary embodiment, CPU 11 reads out and forwards pixel data in the order of alignment of the direction of paper feed—that is, of the Y direction—and image processing is performed based on Y direction alignment, followed by printing.

Figure 6:
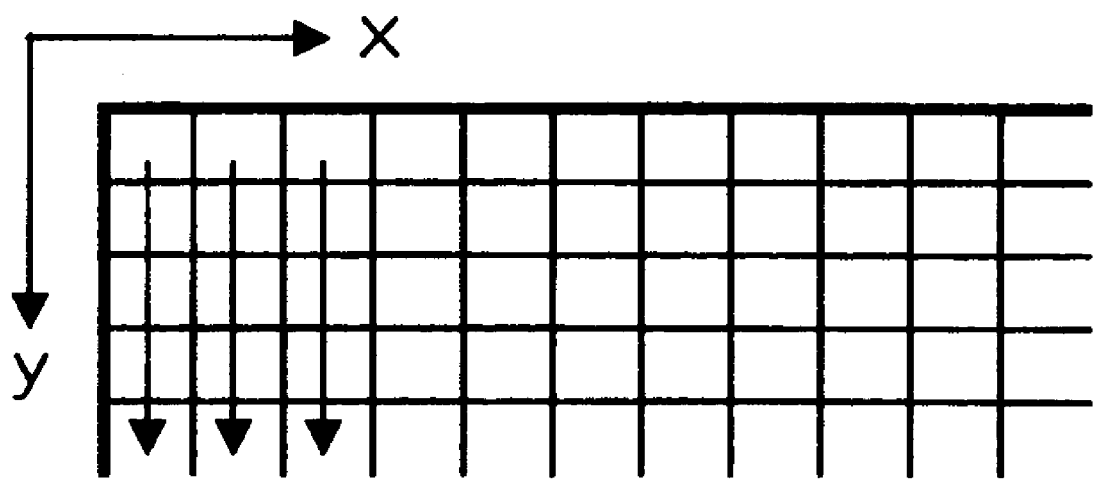
FIG. 6 is a diagram showing a transfer sequence for pixel data to be transferred from a PC to a printer.

Printer 20 sequentially receives a print command and pixel data via communications interface 24. The received pixel data is first stored at RAM 22 in the order in which it is received. Then, the pixel data is transferred in the order of reception by the CPU 11 (or by DMA transfer by a DMA controller (not shown)) from RAM 22 to image processing device 28. In other words, as shown in FIG. 6, the pixel data of the two-dimensional image is input to image processing device 28 based on Y direction alignment.

At image processing device 28, image processing is first carried out at gamma correction section 35, process variation correction section 36 and non-ejecting nozzle correction section 37 in units of one pixel. Image processing device 28 continuously performs image processing, in units of one pixel, of respective sets of pixel data for recording plural pixels aligned in the Y direction using the appropriate LUT for the respective kinds of image processing and that also corresponds to the nozzle 33 that records a given set of pixel data, and performs this processing sequentially along the X direction. As a result, image processing is performed in units of one pixel for all of the image data for the two-dimensional image. In the following, one example of image processing of a one-pixel unit is explained in detail as a specific example.

Figure 7:
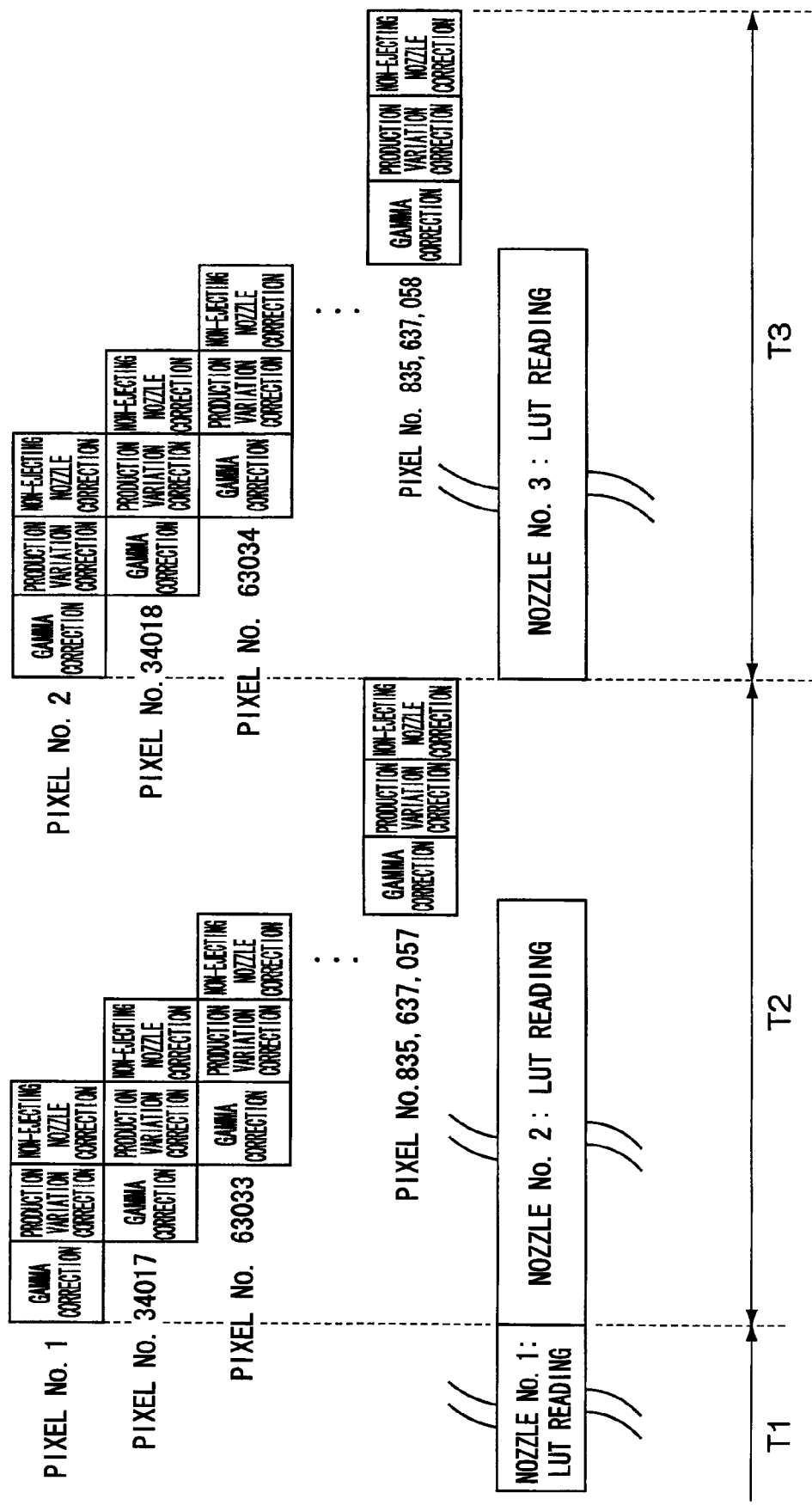
FIG. 7 is a diagram showing a time sequence for image processing in one-pixel units.

FIG. 7 shows a time sequence for image processing of a one-pixel unit in the present exemplary embodiment.

In order to simplify explanation in the following, the reference numeral "33" is omitted from nozzles 33 and, in order to distinguish between the respective 34016 nozzles aligned in the X direction, the first nozzle in the X direction is referred to as "Nozzle No. 1", the second nozzle provided next to "Nozzle No. 1" is referred to as "Nozzle No. 2", and subsequent adjacent nozzles in the X direction are similarly renumbered consecutively up until the last nozzle, "Nozzle No. 34016".

Further, the respective pixels forming the two-dimensional image are referred to in the order of alignment in the X direction as "Pixel No. 1", "Pixel No. 2" . . . "Pixel No. 34016", and pixels in lines from the second line onwards are, similarly, numbered consecutively as "Pixel No. 34017", "Pixel No. 34018" . . . "Pixel No. 63034" . . . "Pixel No. 68032" and so on.

First, as described above, pixel data is input to image processing device 28 in order of alignment in the Y direction. Here, the respective pixel data for pixels to be printed by Nozzle No. 1 (Pixel No. 1, Pixel No. 34017, Pixel No. 63,033 . . . Pixel No. 835,637,057) are first input continuously.

Accordingly, at image processing device 28, during period T1, LUT read section 46 reads out information contained in gamma correction LUT 41 (this LUT is shared by all nozzles) from ROM 23 and writes it into the LUT memory. Further, LUT read section 46 reads out the process variation correction LUT 42 corresponding to Nozzle No. 1 from ROM 23 and writes it into the LUT memory and LUT read section 46 reads out the non-ejecting nozzle correction LUT 43 corresponding to Nozzle No. 1 from ROM 23 and writes it into the LUT memory.

Then, in period T2, gamma correction section 35, process variation correction section 36 and non-ejecting nozzle correction section 37, in turn, sequentially perform image processing with respect to the pixel data for the pixels to be printed at Nozzle No. 1 in the order of input, by pipeline processing.

Concurrently with this pipeline processing, in period T2, LUT read section 46 performs reading and writing of the data for image processing with respect to pixel data for pixels to be printed by the adjacent Nozzle No. 2 (Pixel No. 2, Pixel No. 34018, Pixel No. 63,034 . . . Pixel No. 835,637,058). In other words, LUT read section 46 reads out the process variation correction LUT 42 corresponding to Nozzle No. 2 from ROM 23 and writes it into the LUT memory (albeit in a different storage region from LUT regions currently in use). Further, LUT read section 46 reads out the non-ejecting nozzle correction LUT 43 corresponding to Nozzle No. 2 from ROM 23 and writes it into the LUT memory (albeit in a different storage region from LUT regions currently in use). Since gamma correction LUT 41 is shared by all nozzles, it is used without modification for all pixel data.

Then, when image processing with respect to pixel data for pixels to be printed by Nozzle No. 1 is completed in period T2, image processing with respect to pixel data for pixels to be printed by Nozzle No. 2 is initiated in subsequent period T3. Further, at the same time, read processing of the process variation correction LUT 42 and the non-ejecting nozzle correction LUT 43 corresponding to Nozzle No. 3 is initiated.

As a result, image processing of pixel data for 24567 pixels aligned in the Y direction is performed continuously using LUTs read immediately in advance thereof, and this processing is performed along the X direction. In this way, image processing is carried out in units of one pixel ultimately until Pixel No. 835,671,072.

Figure 8:
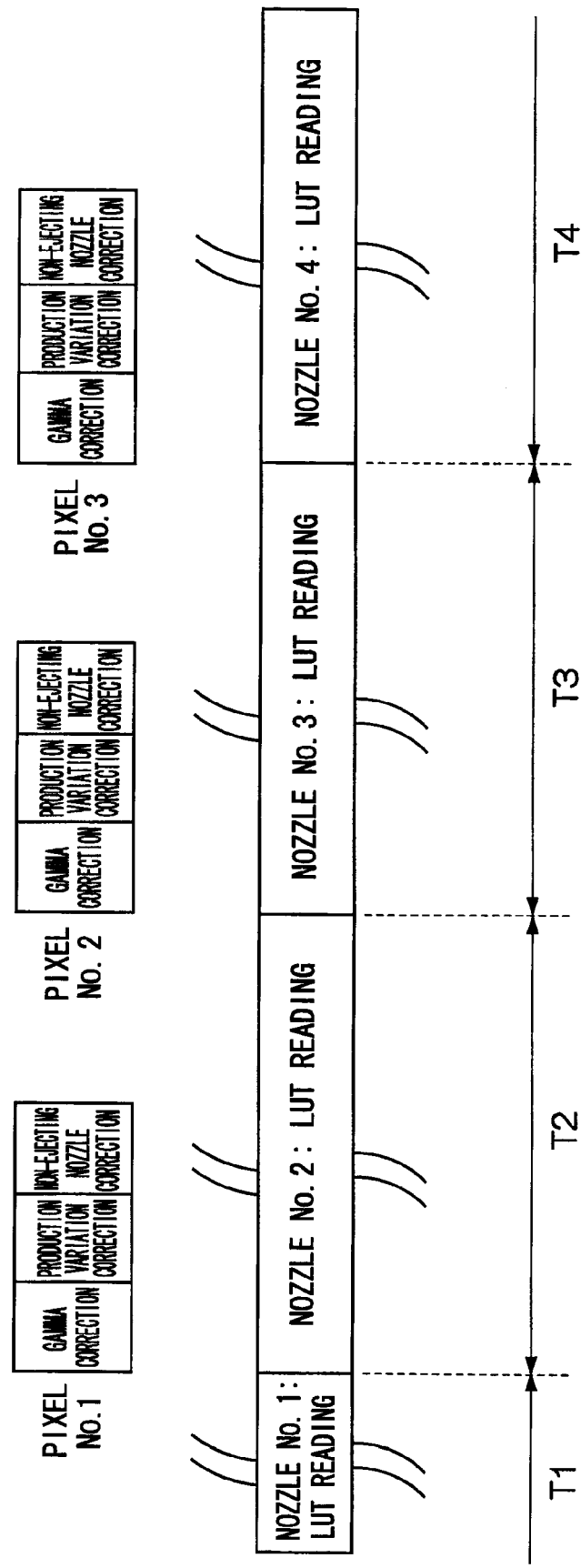
FIG. 8 is a diagram showing a time sequence for image processing in one-pixel units in a conventional system of image processing along the X direction.

For the purpose of comparison with the image processing performed according to the present exemplary embodiment, FIG. 8 shows a time sequence for image processing per one pixel unit in a conventional system of image processing along the X direction. As shown in FIG. 8, conventionally, LUTs are read out for image processing of every one pixel.

Figure 9:
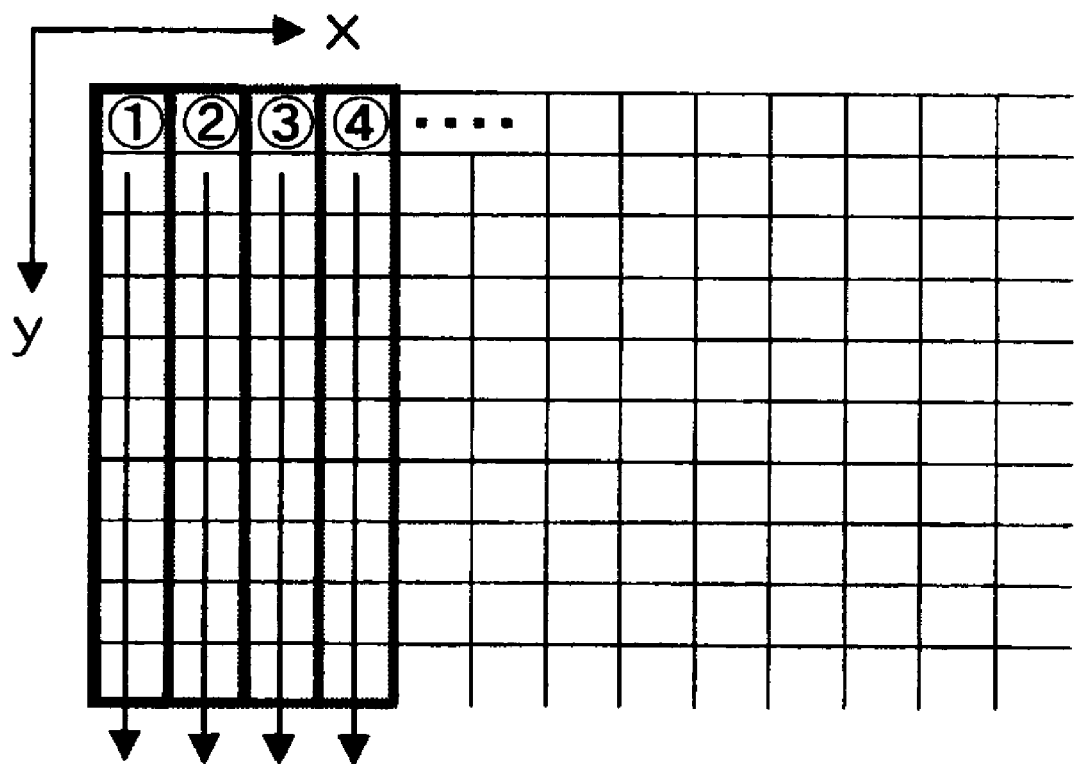
FIG. 9 is an explanatory diagram illustrating an input sequence to a dither processing unit for pixel data after image processing in one-pixel units.
Figure 10:
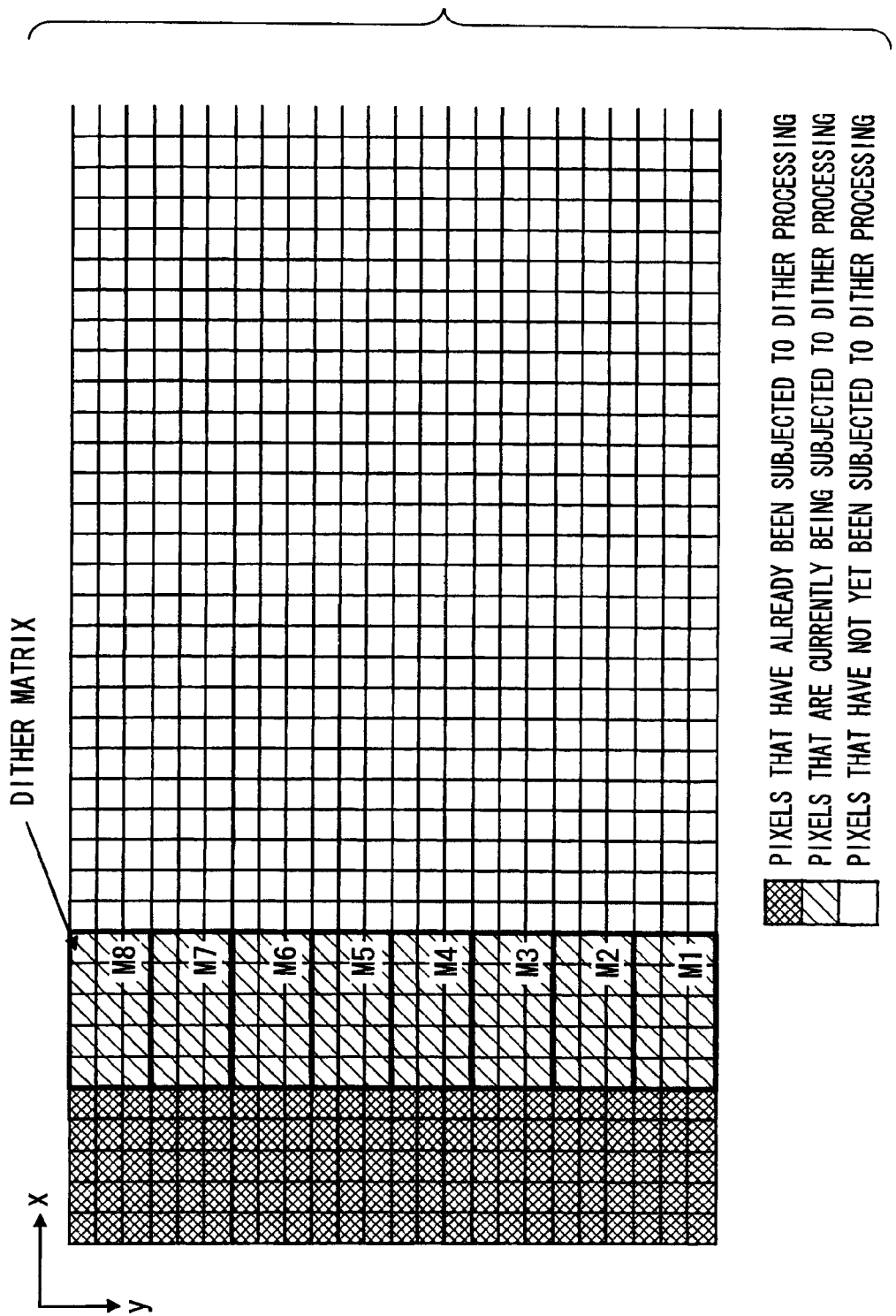
FIG. 10 is an explanatory diagram illustrating dither processing performed at the dither processing unit.
Figure 11:
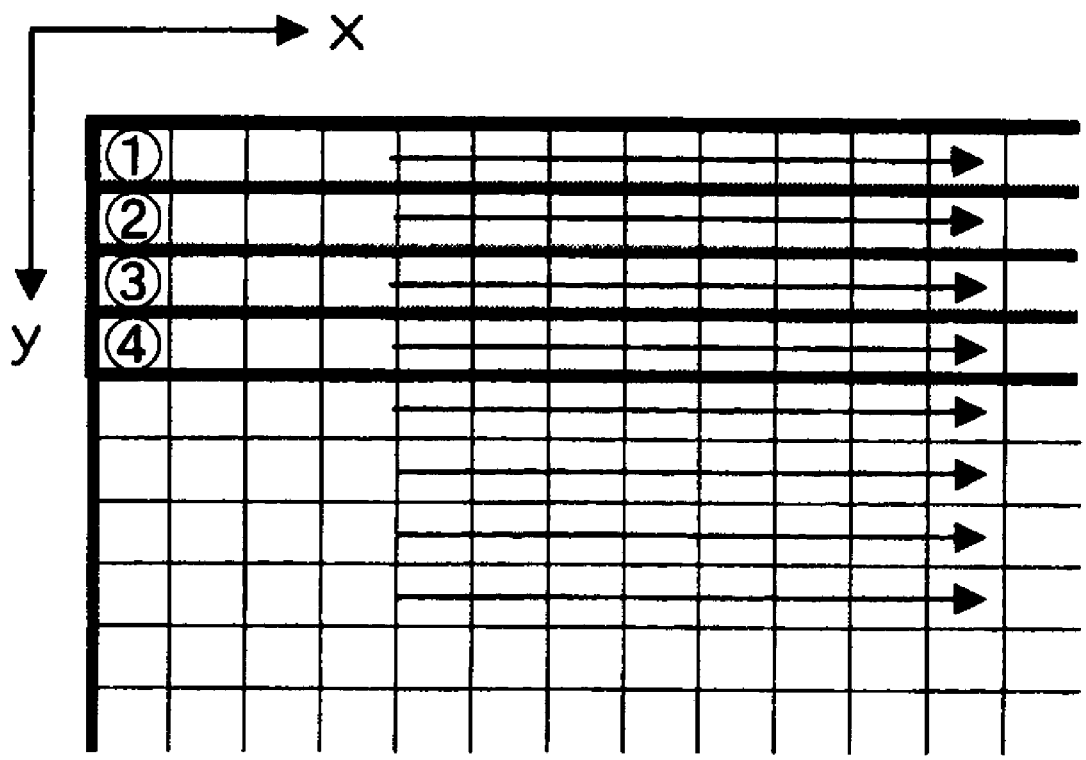
FIG. 11 is an explanatory diagram illustrating an input sequence to a head driver for pixel data after dither processing.

Next, image processing performed in block units at dither processing section 39 in the present exemplary embodiment is explained using the explanatory diagrams of FIGS. 9-11.

FIG. 9 is an explanatory diagram illustrating an input sequence to dither processing section 39 for pixel data after image processing per one pixel unit. FIG. 10 is an explanatory diagram illustrating dither processing performed at dither processing section 39. In FIG. 10, the x-axis and y-axis are shown to be aligned in the same directions as in FIG. 5. However, pixel data for each pixel is stored at intermediate buffer 38 based on alignment in the Y direction, and dither processing section 39 performs processing in accordance with this alignment. FIG. 11 is an explanatory diagram illustrating an input sequence to head driver 26 for pixel data after dither processing.

Dither processing section 39 performs dither processing using respective threshold values contained in dither table 44.

Dither processing compares respective threshold values of a threshold value matrix shown by dither table 44 with pixel data at corresponding positions, and performs binarization processing (or 4-bit or the like low gradation processing) based on the results of the comparison. In this way, the dither processing performed at dither processing section 39 is processed in units of two-dimensional matrices corresponding to the threshold value matrices shown in dither table 44. As a result, the dither processing is processed separately to the image processing that is performed along the Y direction as pipeline sequential processing in units of one pixel (i.e., separately to the gamma correction processing, process variation correction processing and non-ejecting nozzle processing).

The respective pixel data that have been processed in units of one pixel are temporarily stored in intermediate buffer 38 in the order in which they are processed. Since, as described above, processing in units of one pixel is performed in the order in which the pixel data is input, the alignment of pixel data after processing is the same as the alignment of input (the paper feed direction, i.e., the Y direction; refer to FIG. 9). As a result, output from non-ejecting nozzle correction section 37 follows the sequence of pixel data for Pixel No. 1, pixel data for Pixel No. 34017, pixel data for Pixel No. 63033 . . . pixel data for Pixel No. 835,637,057, pixel data for Pixel No. 2 and so on. The pixel data is stored in intermediate buffer 38 in this order.

Dither processing section 39 performs image processing (dither processing) with respect to the pixel data stored in intermediate buffer 38 in units of blocks of data as arrayed thereat. Dither table read section 47 reads out information on dither table 44 from ROM 23 and writes it into the memory allocated for the dither table before the dither processing is performed.

As shown in FIG. 10, dither processing section 39 applies a dither table 44 having a square block of plural pixels (here, 3×5 pixels) with respect to the pixel data aligned in the Y direction, while referring to dither table 44. Using this dither table 44, dither processing section 39 performs plural processing procedures in parallel in the Y direction. By performing this parallel processing in turn along the X direction, dither processing is performed for the pixel data of all the pixels.

Pixel data that has been subjected to dither processing is stored in image memory 40. Since dither processing section 39 outputs pixel data to image memory 40 in the order in which the pixel data is subjected to dither processing, the pixel data is stored in image memory 40 as aligned in the Y direction. Head output control section 45 reads out each of the pixel data stored in image memory 40 and outputs them to head driver 26. It is preferable for head driver 26 to receive image data in individual lines (in the X direction of FIG. 5) or in an arrangement that may be easily converted to such an alignment, since this facilitates processing. Accordingly, in the present exemplary embodiment, the read-out address for the pixel data is set to every 34016 pixels and, as shown in FIG. 11, respective pixel data is output to head driver 26 as aligned in the X direction. Further, when one line's worth of pixel data in the X direction that has been imparted with low gradation is generated and stored at image memory 40, one line's worth of pixel data may be read out and output in the X direction. Further, pixel data may be read out from image memory 40 and sequentially output even at a stage when the amount of pixel data that has been generated and stored does not constitute one line's worth of pixel data in the X direction. In the latter case, head driver 26 waits until a complete one line's worth of pixel data is input.

Further, in the present exemplary embodiment, while image processing performed in units of blocks has been explained using the example of dither processing, the present invention is not limited to this and, for example, error diffusion processing may be performed.

Error diffusion processing also converts multiple gradation image data to low gradation image data and generates image data for driving an element. Error diffusion processing is known. That is, errors that occur when multiple gradation pixel data is converted to low gradation pixel data are distributed to the surrounding pixels according to an error window (an error distribution rate pattern that regulates the extent to which the error is distributed to surrounding pixels) determined in advance. The original multiple gradation pixel data of the target pixel is corrected using cumulative values of error diffused in the prior conversion. The corrected pixel data and the threshold values are compared and the pixel data of the target pixel is converted to low gradation pixel data. Each pixel is processed in a state of dependency with respect to surrounding pixel data. In this way, error diffusion processing is also performed in units of square blocks of several pixels rather than in one-pixel units, namely, in units of error windows. For this reason, error diffusion processing is performed subsequent to the one-pixel unit image processing described above.

When error diffusion processing is performed instead of dither processing, an error diffusion processing section that performs error diffusion processing is provided instead of dither processing section 39 and an error diffusion window is used instead of dither table 44.

Figure 12:
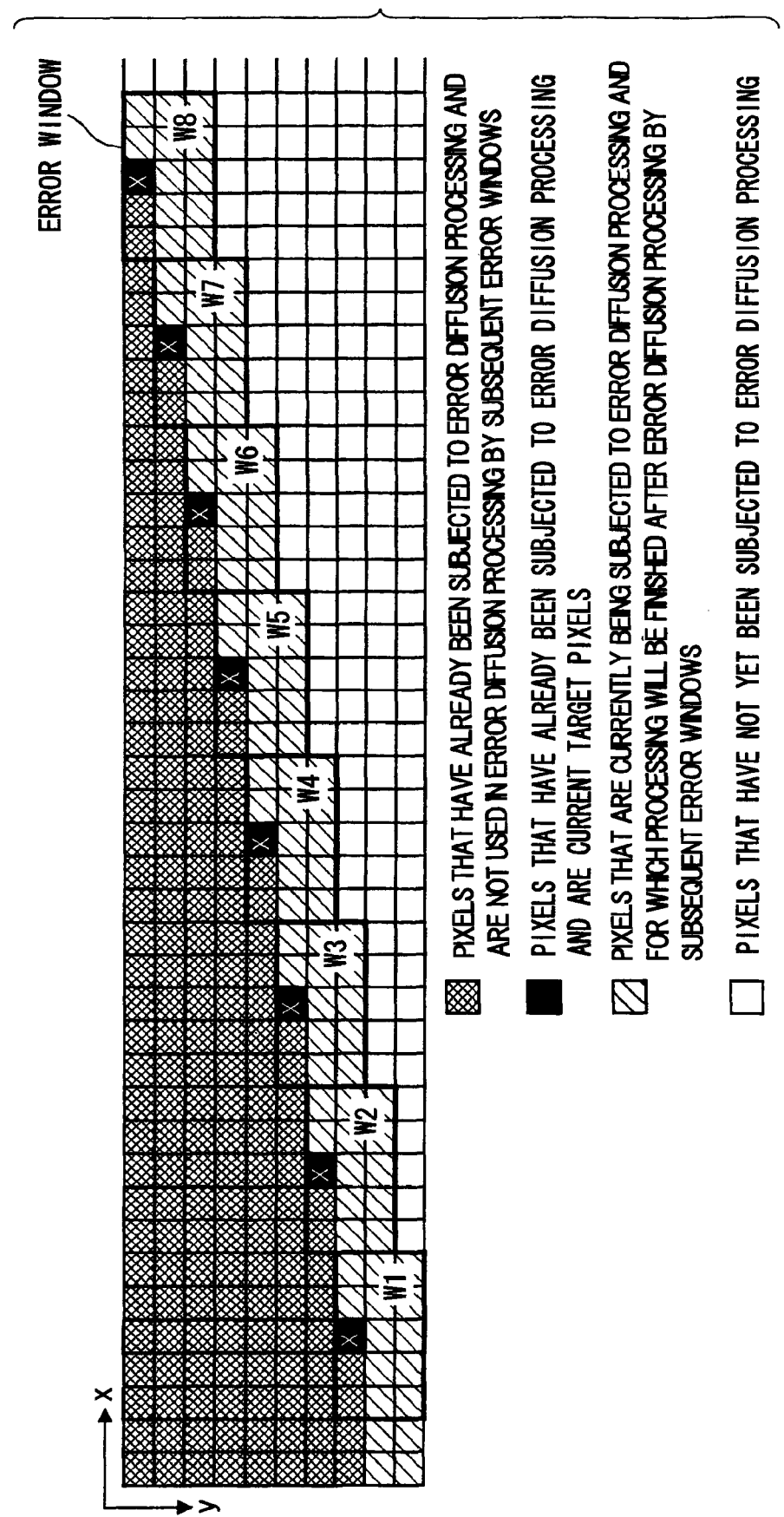
FIG. 12 is an explanatory diagram illustrating error diffusion processing performed at an error diffusion unit.

The error diffusion processing section selects a portion of the image data that has been subjected to image processing in one-pixel units as aligned in the Y direction, and performs error diffusion processing. The error diffusion processing section performs error diffusion processing of plural blocks in parallel using the error window (here, 3×5 pixels). FIG. 12 is an explanatory diagram illustrating error diffusion processing. In FIG. 12, parallel processing of error diffusion processing is performed in 8 locations with respect to the image data. The error window is used in 8 locations respectively displaced by one pixel each in the Y direction and aligned along the X direction without intervals therebetween.

As shown in FIG. 12, the error diffusion processing section first performs error diffusion processing only of error window W8. In FIG. 12, pixels indicated in black inside the error windows represent target pixels being processed at that time. The error diffusion processing section, while moving error window W8 in the X direction, changes the target pixel sequentially along the X direction as it performs processing thereof. After processing is completed of pixels belonging to error window W8 that will affect error window W7, parallel processing using both error window W8 and error window W7 is initiated. Then, while moving error window W8 and error window W7 in the X direction, the error diffusion processing section changes the target pixel in each of the respective windows sequentially along the X direction as it performs processing thereof.

Further, after processing is completed of pixels belonging to error window W8 and error window W7 that will affect error window W6, parallel processing using error window W8, error window W7 and error window W6 is initiated. In this way, the number of parallel processing operations sequentially increases. After the 36th step, this becomes 8 parallel processing operations using error windows W1-W8. The parallel processing is performed successively along the X direction. Ultimately, the image data of every pixel is subjected to error diffusion processing and low gradation pixel data is generated.

The pixel data after completion of error diffusion processing is stored at image memory 40. Since the error diffusion processing section outputs the pixel data to image memory 40 in the order of error diffusion processing, pixel data is stored at image memory 40 as aligned in the Y direction. Head output control section 45 reads out the respective pixel data stored at image memory 40 and outputs them to head driver 26. Similarly to the foregoing description, head output control section 45 outputs the respective pixel data to head driver 26 as aligned in the X direction.

Further, here also, when one complete line of pixel data in the X direction that has been imparted with low gradation is generated and stored at image memory 40, one complete line of pixel data may be read out and output in the X direction. Alternatively, pixel data may be read out from image memory 40 and sequentially output even at a stage when the amount of pixel data that has been generated and stored does not constitute one complete line of pixel data in the X direction. For example, in this example, parallel processing is performed at 8 error windows and pixel data for 8 pixels is imparted with low gradation in parallel. Alternatively, pixel data may be output in units of 8 pixels at each processing step. As a result, 8 pixel's worth of data is input in parallel to head driver 26. Performing error diffusion processing in parallel in this way results in pixel data being output aligned in the X direction even if the pixel data has been processed at earlier stages as aligned in the Y direction.

In the present exemplary embodiment, three examples of image processing performed in units of one pixel have been given and explained (gamma correction processing, process variation correction processing and non-ejecting nozzle correction processing); however, the present invention is not limited to these. Only two out of these three kinds of image processing may be performed, or other kinds of image processing may be added and pipeline processing performed as explained above, thus performing plural image processing operations in parallel. Further, even when only one kind of image processing is performed in units of one pixel (for example, only process variation correction processing), image data should be processed along the Y direction as explained above. However, in such a case, pipeline processing is, of course, not performed.

For example, when the printing content is an image composed of text, a linear image or the like (in the following, "text image"), the original image data is low-gradation image data. As a result, there are cases when printing may be performed without any problems in image quality even when gamma correction processing, process variation correction processing or halftone processing such as dither processing or error diffusion processing are not performed. Accordingly, in the case of a text image or other such image, only non-ejecting nozzle correction processing need be performed.

Further, as described above, non-ejecting nozzle correction LUT 43, which is used in the non-ejecting nozzle correction processing, is made up of 1 bit of correction data for each nozzle 33. The correction data has a smaller size than the pixel data per one pixel (8 bits in the present exemplary embodiment). As a result, reading of the LUT does not incur a significant amount of time. Accordingly, the pixel data may be processed as aligned in the X direction as normal.

Next, an alternative example is explained in which the content of the image processing is changed according to whether the image to be printed is a text image or a non-text image. Since the configuration of the image recording system in the alternative example is the same as that explained using FIGS. 1-4 with respect to the above exemplary embodiment, explanation thereof is omitted. However, head output control section 45 is configured so as to be able to access intermediate buffer 38 in addition to image memory 40, and pixel data is read out and forwarded to head driver 26 either from intermediate buffer 38 or from image memory 40.

Figure 13:
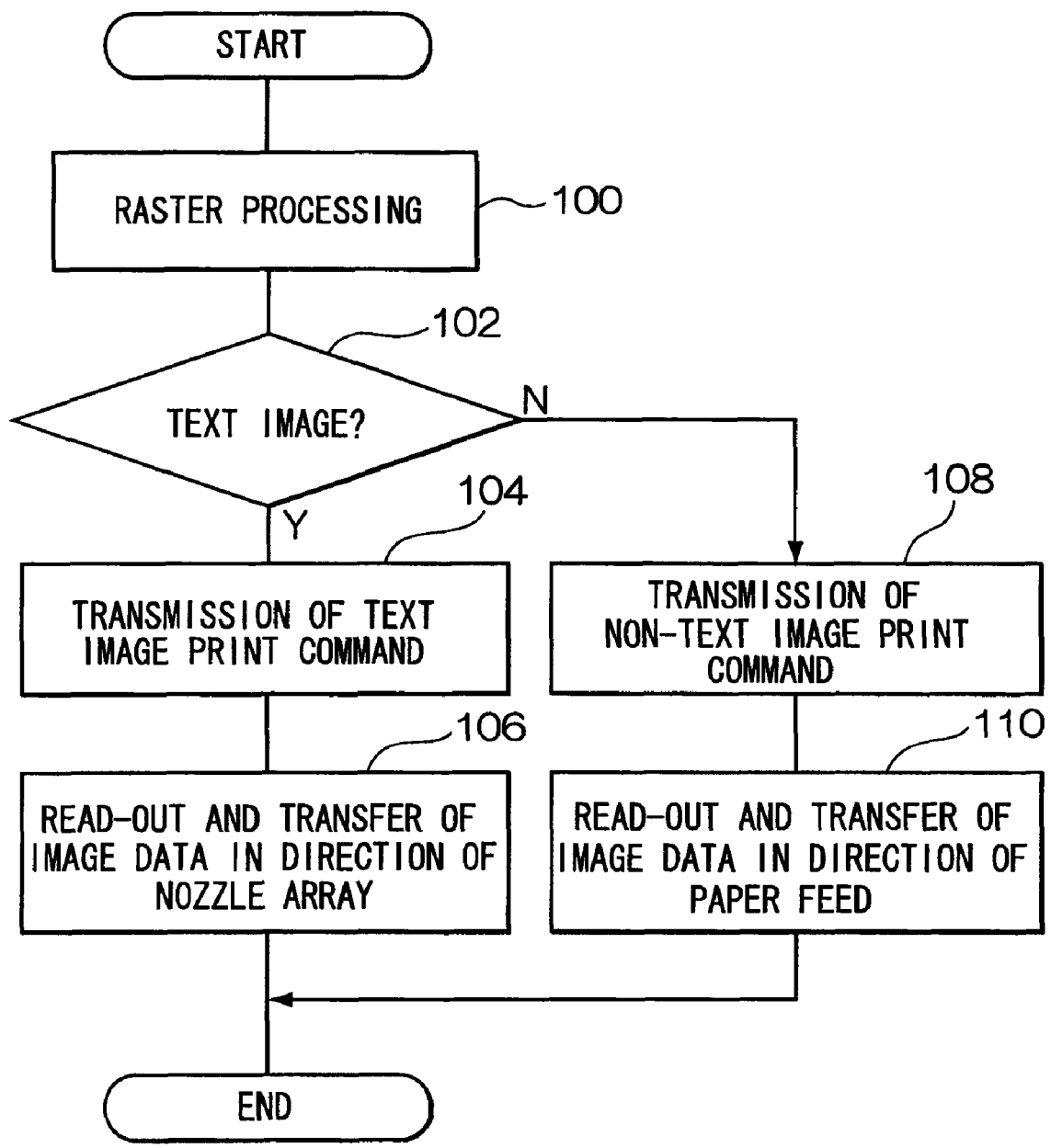
FIG. 13 is a flowchart showing the sequence of image data transfer processing performed at a PC in a variant example.

FIG. 13 is a flowchart showing the sequence of image data transfer processing performed at PC 10 in the alternative example.

First, in step 100, when print data is input to PC 10 from an external computer or the like via communications interface 14, CPU 11 analyzes the print data and performs raster image conversion processing. As a result, the print data is converted to image data for a bitmap image. The respective pixel data constituting the image data are temporarily saved at RAM 12.

In step 102, CPU 11 determines whether or not the image data is image data for a text image. When it is determined in step 102 that the image data is not image data for a text image (that it is a non-text image), a non-text image print command is sent to printer 20 in step 108 and the image data is sent to printer 20 in order of the paper feed direction (Y direction) in step 110.

When CPU 21 of printer 20 receives a non-text image print command, CPU 21 sends a control signal to image processing device 28 such that all of the image processing at gamma correction section 35, process variation correction section 36, non-ejecting nozzle correction section 37 and dither processing section 39 is performed at image processing device 28 in the same manner as in the above exemplary embodiment, and configures settings accordingly. Specifically, CPU 21 activates gamma correction section 35, process variation correction LUT 42 and dither processing section 39. CPU 21 configures LUT read section 46 so as to read only the LUT of gamma correction LUT 41, process variation correction LUT 42, and non-ejecting nozzle correction LUT 43. CPU 21 configures dither table read section 47 so as to read dither table 44. In this way, in the same way as in the foregoing description, image processing device 28 performs image processing in units of one pixel by performing pipeline processing in parallel and, subsequently, performs image processing in units of blocks of plural pixels. Here, since pixel data is transferred in order of alignment in the Y direction, image processing is performed in this order of alignment.

Further, when CPU 11 determines that the image data is image data for a text image in step 102, a text image print command is sent to printer 20 in step 104 and image data is sent to printer 20 in order of the direction in which the nozzles are arrayed (X direction) in step 106.

When CPU 21 of printer 20 receives a text image print command, CPU 21 sends a control signal to image processing device 28 such that only image processing at non-ejecting nozzle correction section 37 is performed at image processing device 28, and configures settings accordingly. Specifically, CPU 21 deactivates gamma correction section 35, process variation correction LUT 42 and dither processing section 39 and configures LUT read section 46 so as to read only the LUT of non-ejecting nozzle correction LUT 43. Subsequently, pixel data received in order of alignment in the X direction is transferred to non-ejecting nozzle correction section 37 by CPU 11 (or by DMA transfer) in the order in which it was received.

Figure 14:
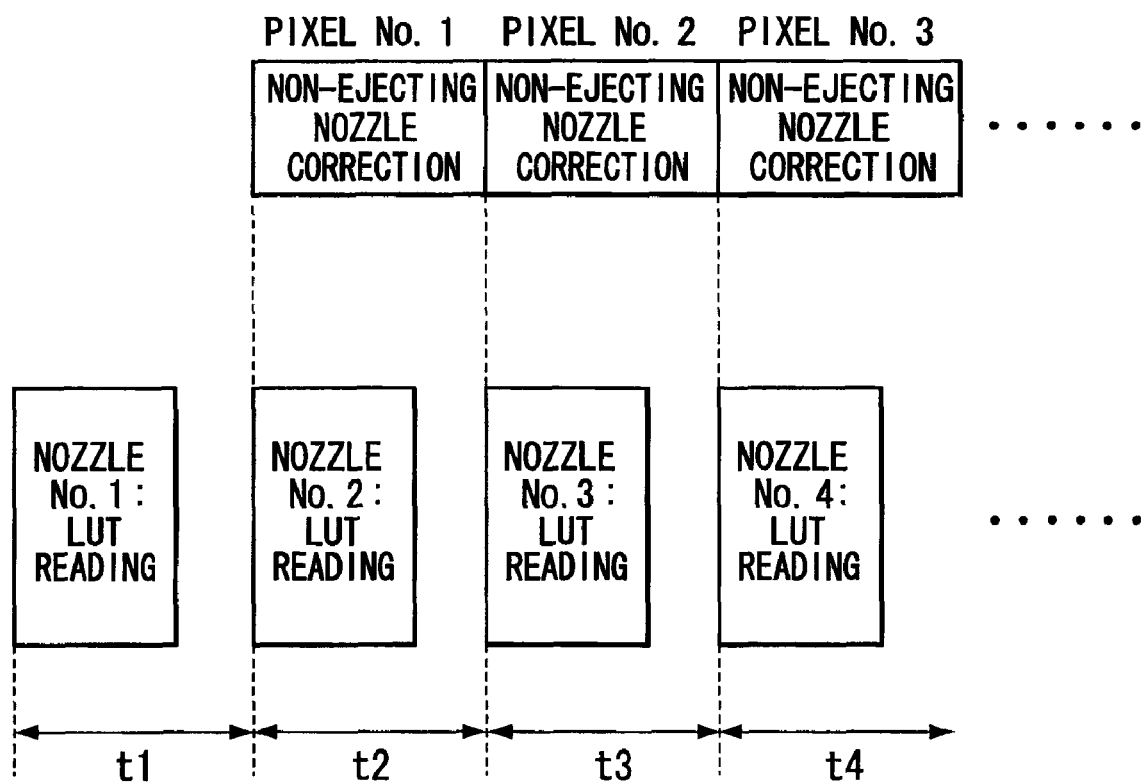
FIG. 14 is a diagram showing a time sequence when only non-ejecting nozzle correction processing is performed at an image processing device in a variant example.

FIG. 14 shows a time sequence when only non-ejecting nozzle correction processing is performed at image processing device 28.

At image processing device 28, firstly, in period t1, LUT read section 46 reads out the non-ejecting nozzle correction LUT 43 corresponding to Nozzle No. 1 from ROM 23 and writes it into the LUT memory.

Then, in period t2, non-ejecting nozzle correction section 37 performs non-ejecting nozzle correction processing with respect to the pixel data for Pixel No. 1 to be printed at Nozzle No. 1. At the same time, in period t2, LUT read section 46 reads out the non-ejecting nozzle correction LUT 43 corresponding to Nozzle No. 2 from ROM 23 and writes it into the LUT memory (albeit in a different storage region from LUT regions currently in use).

In subsequent period t3, image processing is performed with respect to the pixel data for Pixel No. 2 to be printed at Nozzle No. 2. At the same time, the non-ejecting nozzle correction LUT 43 corresponding to the next nozzle, Nozzle No. 3, is read out. This is repeated and processing is performed until the last pixel, whereby pixel data is subjected to image processing as aligned in the X direction. After completion of processing by non-ejecting nozzle correction section 37, processed data is stored at intermediate buffer 38 in the order of processing. Head output control section 45 reads out the pixel data from intermediate buffer 38 in the order of storage thereat and outputs the pixel data to head driver 26 as aligned in the X direction.

In the foregoing, one exemplary embodiment of the present invention and an alternative example thereof have been explained; however, the present invention is not limited to the exemplary embodiment described above and various design features may be changed within the scope of the invention recited in the claims of the present application.

For example, in the above exemplary embodiment, the respective constituent elements of image processing device 28 are explained as configured by hardware that executes the respective functions thereof. However, the present invention is not limited to this and, for example, CPU 21 may execute these functions by executing given programs stored in HDD 31 or the like. In a case in which the above image processing functions are executed by software information processing in this way, respective program modules that perform image processing in units of one pixel (for example, a program module that performs gamma correction processing, a program module that performs process variation correction processing and a program module that performs non-ejecting nozzle correction processing) are connected in a pipeline configuration and processing is performed in parallel as explained above. Modules connected in this way each have in common a processing unit of one pixel and it is a simple matter to perform execution control of a series of pipeline processing operations. Further, the functions of dither processing or error diffusion processing may similarly be executed by software program modules.

Further, performance of either dither processing or error diffusion processing has been exemplified above as halftone processing performed in units of blocks; however, the present invention is not limited to this and, for example, both of dither processing and error diffusion processing may be performed. That is, the threshold value matrix used in the dither processing is applied to the threshold values used in the error diffusion processing.

Further, in the above exemplary embodiment, the image recording system is made up of PC 10 and printer 20; however, printer 20 may be provided with a raster conversion function and printer 20 may directly receive print data without transmitting the data via PC 10. In this case, in the above exemplary embodiment, print data is subjected to raster conversion at printer 20 and, after conversion, the image data is temporarily stored at RAM 22, following which the image data stored at RAM 22 is transferred to image processing device 28.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to are suited to the particular use contemplated. It is intended that the scope of the invention be defined by the following claims and their equivalents.

What is claimed is:

1. An image processing device, comprising:
   a memory that stores conversion characteristic information corresponding to respective recording portions of an image recording device that records an image at a recording medium while moving a recording unit, which is provided with a plurality of the recording portions arrayed in a first direction, relative to the recording medium in a second direction that is perpendicular to the first direction, the conversion characteristic information expressing conversion characteristics for converting image data in units of one pixel;
   a first processing unit that performs a conversion processing procedure along the first direction, continuously converting respective sets of pixel data, each of the sets of pixel data being for recording a plurality of pixels aligned in the second direction and to be recorded by a different one of the recording portions, using conversion characteristic information stored in the memory corresponding to the respective recording portions;
   a second processing unit that performs an image processing procedure in units of a plurality of pixels of the image data that has been processed at the first processing unit, the image data being aligned in the order of processing at the first processing unit; and
   an output unit that outputs the image data that has been processed at the second processing unit to the image recording device as aligned in the first direction.

2. The image processing device of claim 1, wherein:
   the memory respectively stores respective sets of conversion characteristic information corresponding to the respective recording portions in accordance with different conversion processing procedures, or respectively stores respective sets of conversion characteristic information corresponding to the respective recording portions and conversion characteristic information shared by each of the recording portions in accordance with various different conversion processing procedures; and
   the first processing unit, using the conversion characteristic information stored in the memory, performs a plurality of the conversion processing procedures in units of one pixel by pipeline processing and, at the same time, executes the plurality of conversion processing procedures in parallel.

3. The image processing device of claim 1, wherein the second processing unit performs a plurality of the image processing procedures in units of a plurality of pixels in parallel.

4. The image processing device of claim 1, wherein the first processing unit, when the size of the conversion characteristic information used in the conversion processing procedure in units of one pixel is less than the size of one pixel of image data, performs the conversion processing procedure along the second direction, continuously converting respective sets of pixel data, each of the sets of pixel data being for recording a plurality of pixels aligned in the first direction, using conversion characteristic information stored in the memory corresponding to the respective recording portions that form the plurality of pixels.

5. The image processing device of claim 1, wherein the output device, when image processing is not performed at the second processing unit, outputs the image data that has been processed at the first processing unit to the image recording device as aligned in the first direction.

6. The image processing device of claim 1, wherein the conversion processing performed at the first processing unit includes at least one of gamma correction processing, process variation correction processing of the plurality of recording portions, or recordability correction processing of the plurality of recording portions.

7. The image processing device of claim 1, wherein when the image data is image data for a text image, the first processing unit performs conversion processing along the second direction, continuously converting respective sets of pixel data, each of the sets of pixel data being for recording a plurality of pixels aligned in the first direction, using conversion characteristic information corresponding to the recordability of respective recording portions that form the plurality of pixels, the second processing unit does not perform image processing, and the output unit outputs the image data that has been processed at the first processing unit to the image recording unit as aligned in the first direction.

8. The image processing device of claim 1, wherein the image processing procedure performed at the second processing unit includes at least one of dither processing or error diffusion processing.

9. The image processing device of claim 1, wherein the image data is data that has been converted to a raster image of an image that is to be recorded.

10. An image recording system comprising:
an image recording device that records an image at a recording medium while moving a recording unit, which is provided with a plurality of recording portions arrayed in a first direction, relative to the recording medium in a second direction that is perpendicular to the first direction; and
an image processing device, the image processing device comprising:
a memory that stores conversion characteristic information corresponding to each of the recording portions of the image recording device and expressing conversion characteristics for converting image data in units of one pixel;
a first processing unit that performs a conversion processing procedure along the first direction, continuously converting respective sets of pixel data, each of the sets of pixel data being for recording a plurality of pixels aligned in the second direction and to be recorded by a different one of the recording portions, using conversion characteristic information stored in the memory corresponding to the respective recording portions;
a second processing unit that performs an image processing procedure in units of a plurality of pixels of the image data that has been processed at the first processing unit, the image data being aligned in the order of processing at the first processing unit; and
an output unit that outputs the image data that has been processed at the second processing unit to the image recording device as aligned in the first direction.

11. The image recording system of claim 10, wherein:
the memory respectively stores respective sets of conversion characteristic information corresponding to the respective recording portions in accordance with different conversion processing procedures, or respectively stores respective sets of conversion characteristic information corresponding to the respective recording portions and conversion characteristic information shared by each of the recording portions in accordance with various different conversion processing procedures; and
the first processing unit, using the conversion characteristic information stored in the memory, performs a plurality of the conversion processing procedures in units of one pixel by pipeline processing and, at the same time, executes the plurality of conversion processing procedures in parallel.

12. The image recording system of claim 10, wherein the second processing unit performs a plurality of the image processing procedures in units of a plurality of pixels in parallel.

13. The image recording system of claim 10, wherein the first processing unit, when the size of the conversion characteristic information used in the image processing in units of one pixel is less than the size of one pixel of image data, performs the conversion processing along the second direction, continuously converting respective sets of pixel data, each of the sets of pixel data being for recording a plurality of pixels aligned in the first direction, using conversion characteristic information stored in the memory corresponding to the respective recording portions that form the plurality of pixels.

14. The image recording system of claim 10, wherein the output device, when image processing is not performed at the second processing unit, outputs the image data that has been processed at the first processing unit to the image recording device as aligned in the first direction.

15. An image processing method, comprising:
storing conversion characteristic information corresponding to respective recording portions of an image recording device that records an image at a recording medium while moving a recording unit, which is provided with a plurality of the recording portions arrayed in a first direction, relative to the recording medium in a second direction that is perpendicular to the first direction, the conversion characteristic information expressing conversion characteristics for converting image data in units of one pixel;
performing conversion processing (first processing) along the first direction by continuously converting respective sets of pixel data, each of the sets of pixel data being for recording a plurality of pixels aligned in the second direction and to be recorded by a different one of the recording portions, using conversion characteristic information stored in the memory corresponding to the respective recording portions;
performing image processing (second processing) in units of a plurality of pixels of image data that has been processed in the first processing, the image data being aligned in the order of processing of the first processing; and
outputting the image data that has been processed in the second processing to the image recording device as aligned in the first direction.

16. A non-transitory computer readable medium storing a program causing a computer to execute a process for image processing, the computer comprising a memory that stores conversion characteristic information corresponding to respective recording portions of an image recording device that records an image at a recording medium while moving a recording unit, which is provided with a plurality of the recording portions arrayed in a first direction, relative to the recording medium in a second direction that is perpendicular to the first direction, the conversion characteristic information expressing conversion characteristics for converting image data in units of one pixel and the image processing comprising:

performing conversion processing (first processing) along the first direction, continuously converting respective sets of pixel data, each of the sets of pixel data being for recording a plurality of pixels aligned in the second direction and to be recorded by a different one of the recording portions, using conversion characteristic information stored in the memory corresponding to the respective recording portions;

performing image processing (second processing) in units of several pixels of image data that has been processed in the first processing, the image data being aligned in the order of processing of the first processing; and outputting the image data that has been processed in the second processing to the image recording device as aligned in the first direction.

* * * * *